(12) United States Patent
Wobben

(10) Patent No.: US 6,841,076 B1
(45) Date of Patent: Jan. 11, 2005

(54) METHOD AND DEVICE FOR DESALTING WATER

(76) Inventor: Aloys Wobben, Argestrasse 19, Aurich, D-26607 (DE)

( * ) Notice: Subject to any disclaimer, the term of this patent is extended or adjusted under 35 U.S.C. 154(b) by 0 days.

(21) Appl. No.: 10/031,840

(22) PCT Filed: Mar. 18, 2000

(86) PCT No.: PCT/EP00/02417

§ 371 (c)(1),
(2), (4) Date: May 17, 2002

(87) PCT Pub. No.: WO01/05490

PCT Pub. Date: Jan. 25, 2001

(30) Foreign Application Priority Data

Jul. 20, 1999 (DE) .......................................... 199 33 147

(51) Int. Cl.[7] .............................................. B01D 61/02
(52) U.S. Cl. .................... 210/652; 210/416.1; 210/258; 417/404; 417/390
(58) Field of Search .................................. 210/652, 637, 210/416.1, 252, 258, 349; 417/404, 390, 25–29, 53, 403, 401

(56) References Cited

U.S. PATENT DOCUMENTS

| | | | |
|---|---|---|---|
| 3,825,122 A | | 7/1974 | Taylor .......................... 210/134 |
| 4,434,056 A | * | 2/1984 | Keefer .......................... 210/637 |
| RE32,144 E | * | 5/1986 | Keefer .......................... 210/637 |
| 5,628,198 A | | 5/1997 | Permar .......................... 62/123 |
| 6,017,200 A | * | 1/2000 | Childs et al. ................ 417/404 |

FOREIGN PATENT DOCUMENTS

DE          2448985 A1      4/1976

* cited by examiner

Primary Examiner—W. L. Walker
(74) Attorney, Agent, or Firm—Seed IP Law Group PLLC

(57) ABSTRACT

The invention concerns a method for desalting water by reverse osmosis, in particular for desalting sea water, whereby salt water at a first pressure level is introduced into a pressure compensating device, and is conveyed from the pressure-compensating device at a second, higher pressure level into a membrane module, whereby desalted water and concentrated salt water are discharged from the membrane module. In order to increase the efficiency and consequently the energy balance of such a method, the invention proposes to continuously introduce the concentrated salt water, which has been discharged from the membrane module, at a second pressure level into the pressure-compensating device, wherein it is used to subject the salt water introduced into the pressure compensating device to the second pressure level, and to discharge the salt water and convey it to the membrane module. The invention also concerns a device for implementing this method.

16 Claims, 5 Drawing Sheets

METHOD AND DEVICE FOR DESALTING WATER

Figure 1:
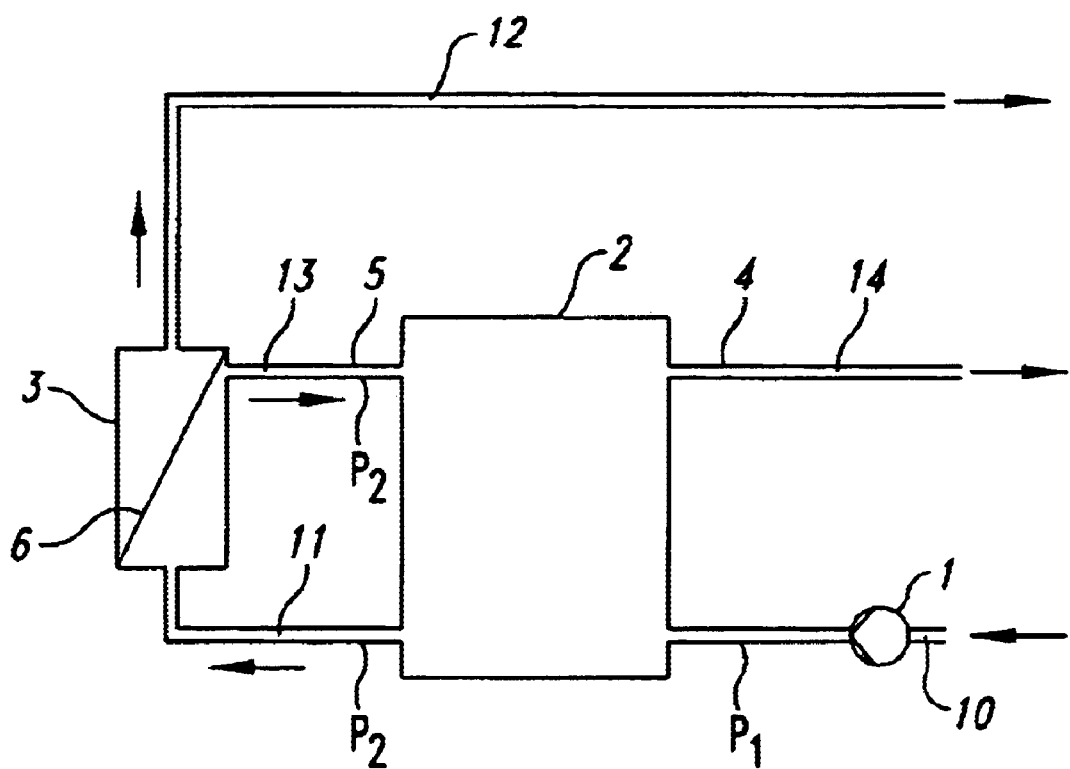

This application is a 35 USC 371 (National Stage) of PCT/EP00/02417, filing date Mar. 18, 2000, which claims priority over the German Application No. 199 33 147.2, filing date Jul. 20, 1999.

BACKGROUND OF THE INVENTION

1. Field of the Invention

The invention concerns a method for desalting water by reverse osmosis, as well as a device for the implementation of that method.

2. Description of the Related Art

A method and device for desalting water are known from WO 97/21483. Here, the salt water is pressurized by applying an exterior pressure to a pressure medium, the pressure of which is then transferred to the salt water. The design of one embodiment is such, that the salt water at first is pumped by a first pump into a first chamber of a three-chamber configuration at relatively low pressure. Subsequently, a high-pressure pump applies a high pressure to a pressure medium in a second chamber of the three-chamber configuration, which results in the saltwater in the first chamber to be conveyed into the membrane module at the high pressure necessary for reverse osmosis. Simultaneously, the concentrated salt water, which has not penetrated through the membrane of the membrane module, is conveyed into a third chamber of the three-chamber configuration. Finally, the next delivery of salt water by the first pump into the first chamber results in the concentrated salt water being discharged from the third chamber, and ultimately from the device.

In this known method the high-pressure pump delivers a pressure medium at a high pressure level to the membrane modules, and no longer has to pump salt water, as has been the case in other known methods, and which due to the salt water's oxidation potential exacted high demands on the material of the pump, which significantly increased its costs. But a high-pressure pump to create the pressure necessary for reverse osmosis is still required, which has a negative effect on the energy balance, and consequently on the overall efficiency of the device. In addition, the known method operates in two processing steps, whereby one of the two processing steps generates desalted water, while the other processing step re-supplies salt water and discharges the concentrated salt water.

BRIEF SUMMARY OF THE INVENTION

The object of the invention is to provide a method with improved efficiency and a device for the implementation of desalting water.

The invention is based on the realization that a pump to generate the high pressure necessary for reverse osmosis can be omitted entirely and be replaced by a pump generating a significantly lower pressure, if the pressure, which the concentrated salt water inevitable possesses at the outlet of the membrane module, can be utilized by continuously re-circulating this concentrated salt water into the pressure-compensating device to pressurize the salt water pumped into the pressure-compensating device. In this context it is particularly beneficial that this process takes place continuously, since otherwise the pressure in the salt water feed pipe from the pressure-compensating device to the membrane module would drop and would have to be re-generated by a high-pressure pump, as is the case in the known method, and in addition no continuous production of desalted water would be possible.

Advantageous further developments of the method and the device follow from the dependent claims.

The invention is explained in more detail in the following with the help of the figures.

BRIEF DESCRIPTION OF THE SEVERAL VIEWS OF THE DRAWING(S)

Figure 2:
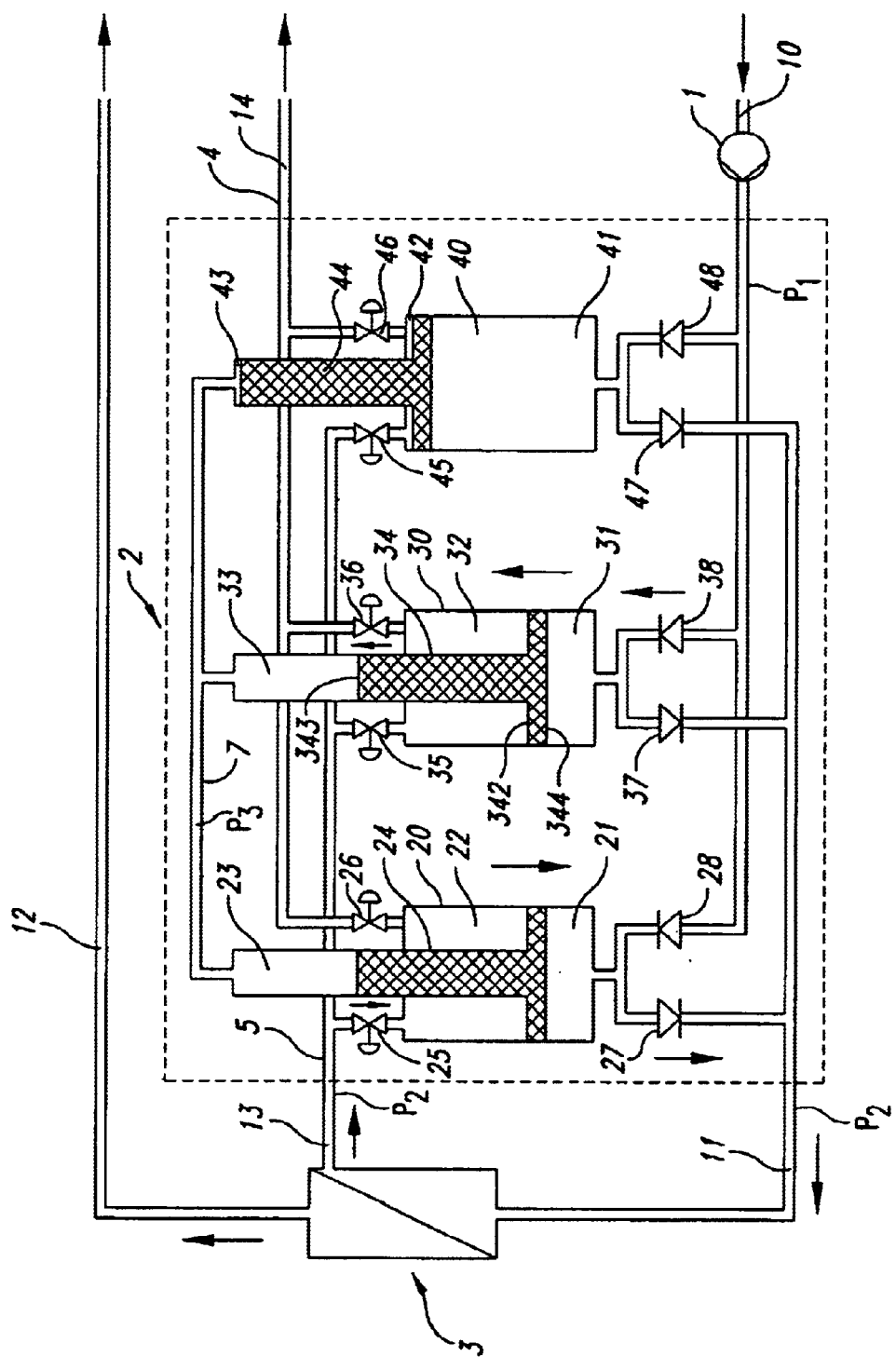
Figure 3A:
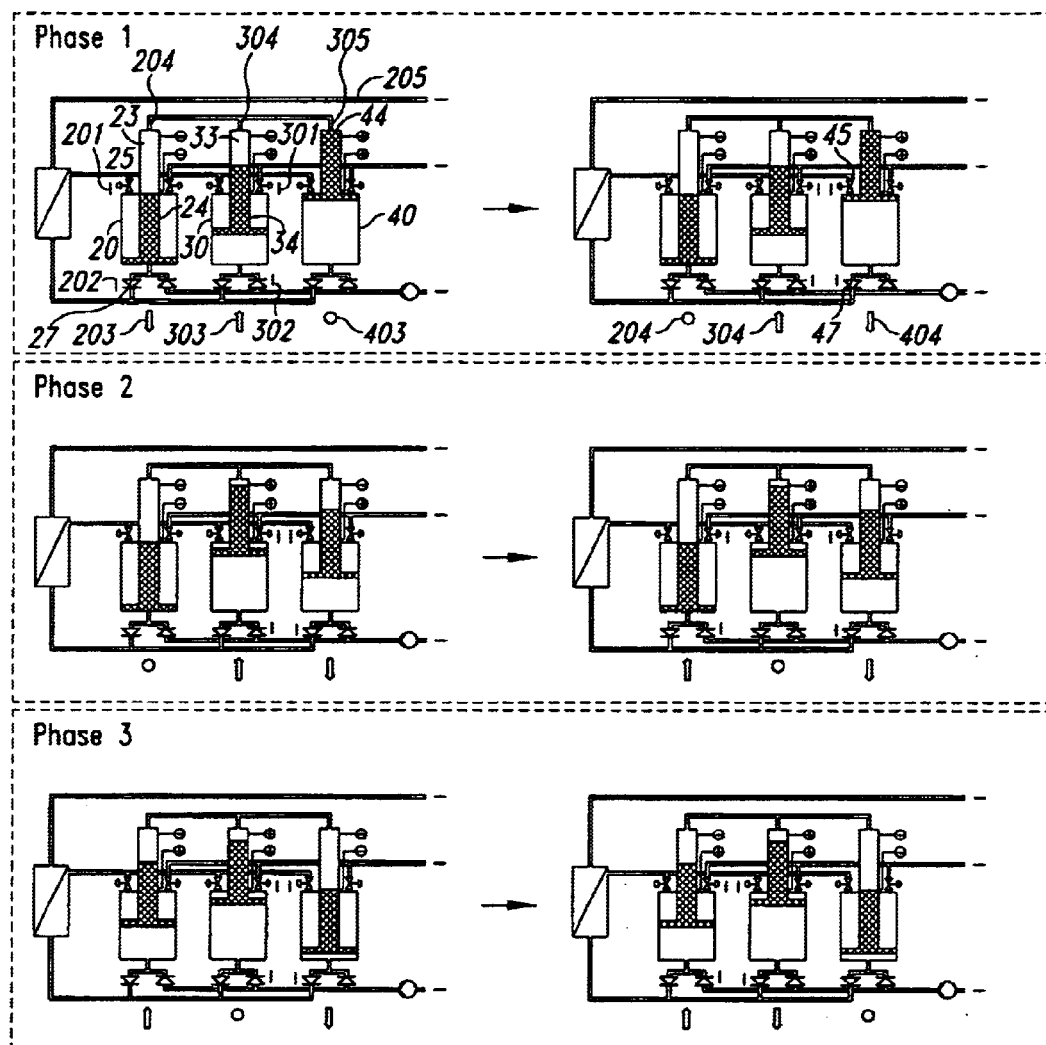
Figure 3B:
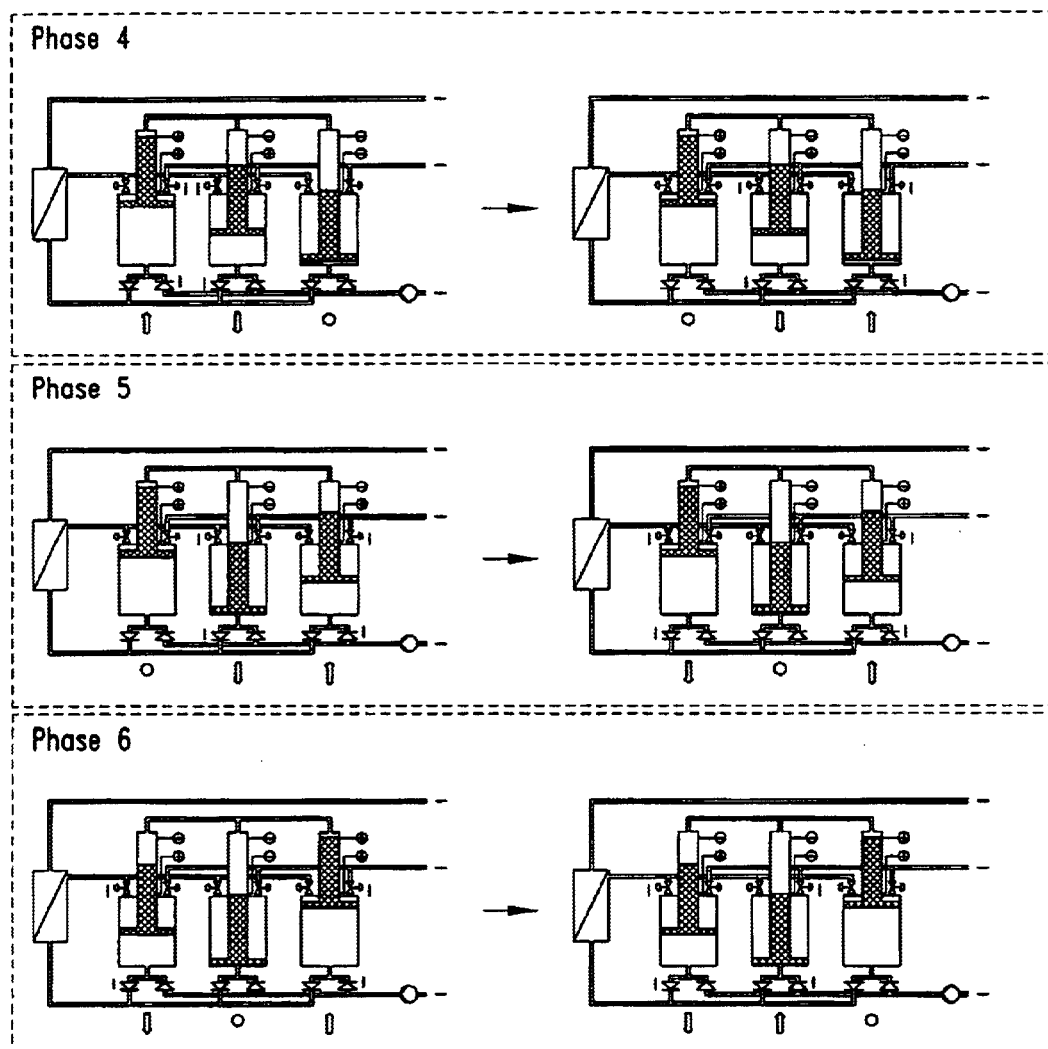
Figure 4:
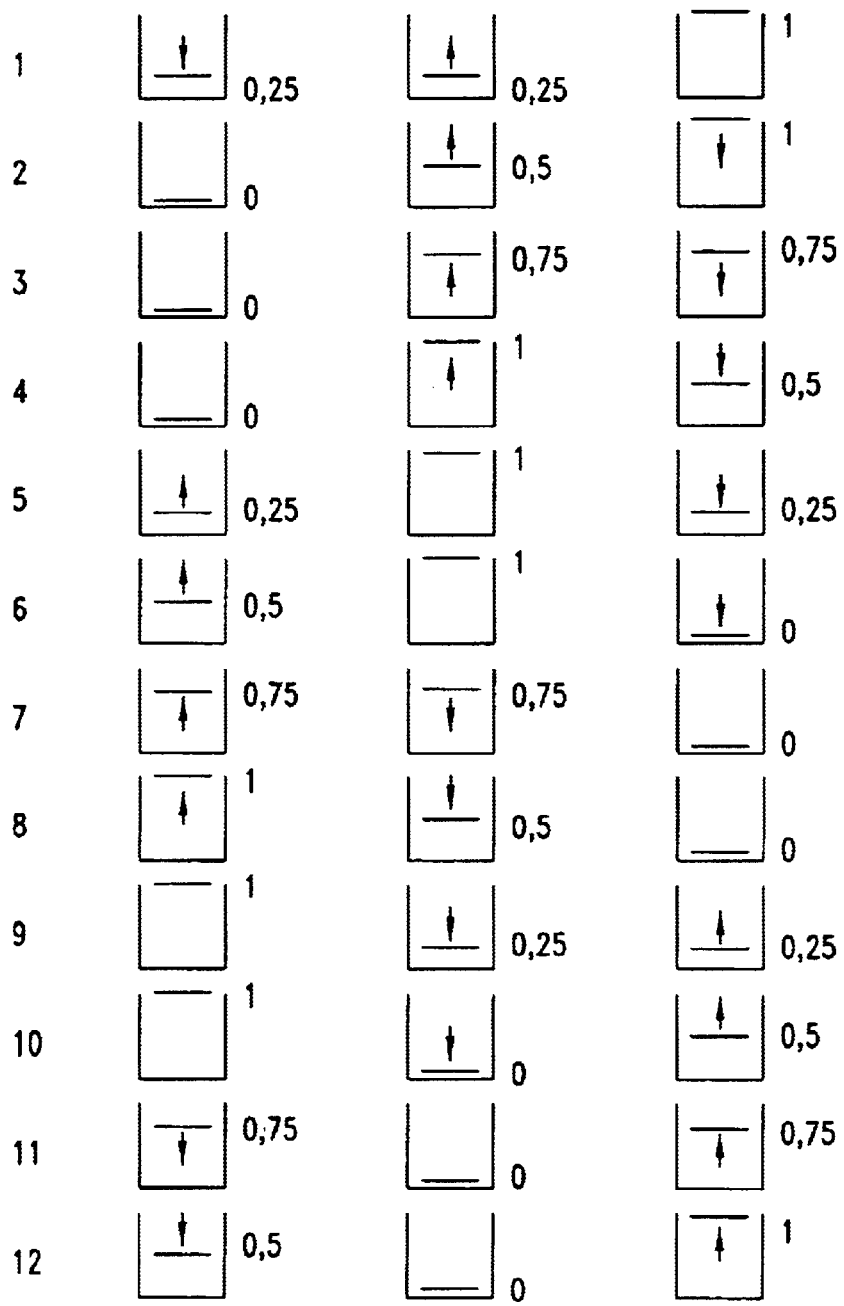
Figure 4:
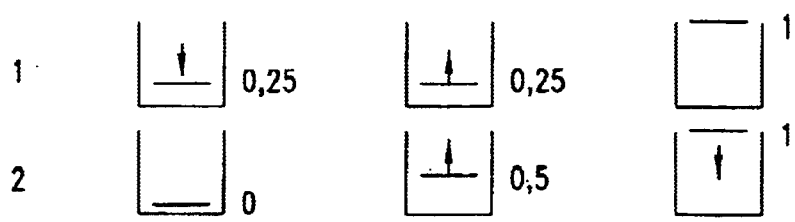

FIG. 1 shows a schematic diagram illustrating the method according to the invention, FIG. 2 shows an embodiment of the device according to the invention, FIGS. 3a and 3b show representations of this embodiment during different operating stages, and FIG. 4 is a representation of the operating stages of this embodiment during a complete operating cycle.

DETAILED DESCRIPTION OF THE INVENTION

The schematic diagram of FIG. 1 shows a feed pump 1 to introduce salt water 10 into a pressure-compensating device 2 at a first pressure $p_1$. The same salt water 11, which now is pressurized to the high operating pressure necessary for reverse osmosis, is conveyed from the pressure-compensating device 2 to the membrane module 3. Here part of the salt water 1, due to the high pressure, penetrates though the membrane 6 (for example 25% of the salt water 1), is desalted in the process, and is discharged as desalted water 12. The remaining portion of the salt water 11 (e.g., 75%) cannot penetrate through the membrane 6, and is returned as concentrated salt water 13, still at the high pressure level $p_2$, to the pressure-compensating device 2 through a connecting line 5. There, this high pressure level is used, in a manner still to be explained in more detail, to pressurize the salt water 10 introduced into the pressure-compensating device 2 to a high pressure level and to convey it to the intake of the membrane module 3. Simultaneously, also in a manner still to be explained in more detail, the pressure level $p_1$, to which the salt water 10 is pressurized by the feed pump 1, is used in the pressure-compensating device 2 to ultimately discharge any concentrated salt water 14 present therein through the discharge line 4. All of the described stages take place simultaneously and continuously, so that no high-pressure pump is required to re-generate a high operating pressure, and desalted water 12 is available continuously.

In particular the design and operating principle of the pressure-compensating device 2 will be explained in more detail with help of the invention's embodiment shown in FIG. 2. Here, the pressure-compensating device possesses three identical piston devices 20, 30, 40, each of which possesses one intake chamber 21, 31, 41 to take in the salt water 10, one discharge chamber 22, 32, 42 to accept the concentrated salt water 13, and one pressure chamber 23, 33, 43.

Each of the piston devices 20, 30, 40 contains a special piston 24, 34, 44, which subdivides the piston interior into the mentioned chambers, and which in the drawing can move in the vertical direction within the piston arrangement. Feed pipes with (passive) check valves 28, 38, 48 lead from the feed pump 1 to each of the intake chambers 21, 31, 41. Hereby, the design of the check valves 28, 38, 48 is such that they open to admit flow if the pressure level in the feed pipe is higher than that in the intake chambers 21, 31, 41. The feed pipes from the intake chambers 21, 31, 41 to the membrane module 3 also contain check valves 27, 37, 47 of this type, but with a different flow direction. In contrast, the feed pipe 5 from the membrane module to the discharge chambers 22, 32, 42, and the discharge line 4 from the discharge chambers 22, 32, 42, are provided with actively controlled valves 25, 35, 45, and 26, 36, 46, respectively, which may be used to regulate the inflow of concentrated salt water 13 from the membrane module 3, or the outflow of the concentrated salt water 14 from the pressure-compensating device 2. The pressure chambers 23, 33, 43 are connected to each other by a connecting line 7, in order to enable pressure compensation between these three chambers and to ensure an identical pressure level $p_3$ in all three chambers.

The following illustrates the operating principle of the device: The feed pump 1 pumps 100% of the required volume of salt water 10 at a first pressure $p_1$ level (e.g., 17.5 bar) into the intake chamber 31, whereby the check valve 38 opens, which is indicated by the arrow next to it. At this time the valve 36 is open (indicated by the arrow next to it), so that the concentrated salt water 14 present in the discharge chamber 32 can be discharged through the discharge line 4. As a result of the salt water 10 flowing into the intake chamber 31 at a pressure level $p_1$, the piston 34 is subjected to a force $F=p_1 \cdot A$, where A is the surface area of the piston face 341. As a result, the piston 34 is pushed upward, as indicated in the figure, and the concentrated salt water present in the discharge chamber 32 is discharged through the valve 36 and the discharge line 4. The pressure level $P_3$ prevailing in the pressure chamber 33 gives rise to an opposing force $FG=P_3 \cdot A_G$ ($A_G$ is the surface area of the part 343 of the rear of the piston, e.g., a quarter of the piston's rear side), which is nearly as large, or slightly smaller than the force F. During the same shown operating stage, the valve 25 is open, so that the concentrated salt water 13 flows from the membrane module 3 into the discharge chamber 22 at the pressure level $p_2$ (e.g., 70 bar).

Simultaneously, in the pressure chamber 23, which has been filled by the pressure medium through the connecting line 7 due to the upward travel of the piston 34, a force is exerted on the piston 24, causing it to travel downward, as indicated by the arrow. This causes the salt water 11 to be conveyed from the intake chamber 21 through the open check valve 27 to the membrane module 3. Inevitably, this takes place at the pressure level $p_2$ (70 bar), since the discharge chamber 22 and the pressure chamber 23 are subjected to a pressure of that level. All other valves are closed during the shown operating stage.

Consequently, the shown embodiment of the pressure-compensating device 2 achieves a pressure transformation, which allows a highly efficient energy recovery from the concentrated salt water 13 being discharged. For this reason, instead of a high-pressure pump to generate the high operating pressure necessary for reverse osmosis one only requires a low-power filling pump 1, which in this particular case only has to generate a pressure level that is one quarter of the working pressure.

FIGS. 3a and 3b show six different successive operating stages of the device according to the invention. Hereby the arrows 201, 202, 301, 302 are meant to indicate an open valve and the direction of the flow. The arrows 203, 303, and the zero 403 are meant to show whether the piston of the respective piston device 20, 30, 40 is moving, and if so, the direction of its travel. Position sensors 204, 205, 304, 305 to detect the piston position are provided at each of the upper and lower ends of the pressure chambers 23, 33, 43 of the piston devices 20, 30, 40. The left-hand diagram of each of the stage diagrams shows the valve position and piston travel direction that were in effect to reach the shown piston position. The right-hand diagram of each stage diagram then shows how from this point in time the pistons will move as a result of the changed valve settings. For example, the left-hand diagram of the representation of stage 1 shows that up to that moment the piston 24 has been traveling downward to the limit stop (arrow 203), that the piston 34 is in the process of traveling upwards (arrow 303), and that the piston 44 was remaining at an upper limit position (zero 403). After switching the valves—valve 25 has been closed and valve 45 has been opened; valve 27 closes whereupon valve 47 opens automatically—the piston 24 remains in its lower limit position, as shown in the right-hand diagram of the representation of stage 1, while the piston 34 continues to travel upward and the piston 44 is traveling downward. The last stage 6 is again followed by stage 1.

The following table illustrates the valve settings in the six shown stages, whereby '+' represents an open valve and '−' represents a closed valve.

| Stage<br>Valve | 1 | 2 | 3 | 4 | 5 | 6 |
|---|---|---|---|---|---|---|
| 25 | + | − | − | − | − | + |
| 26 | − | − | + | + | − | − |
| 35 | − | − | − | + | + | − |
| 36 | + | + | − | − | − | − |
| 45 | − | + | + | − | − | − |
| 46 | − | − | − | − | + | + |
| 27 | + | − | − | − | − | + |
| 28 | − | − | + | + | − | − |
| 37 | − | − | − | + | + | − |
| 38 | + | + | − | − | − | − |
| 47 | − | + | + | − | − | − |
| 48 | − | − | − | − | + | + |

Finally, FIG. 4 shows the operating states, i.e., the piston positions over the course of a complete operating cycle, which here has been subdivided into twelve individual stages. Once again, the direction of the arrow represents the direction of travel of the respective piston. In one embodiment, this process takes place continuously.

The invention is not restricted to the shown embodiment; in particular the pressure-compensating device can be of a different design. Alternative designs are possible, for example configurations with only two piston devices, or more than three piston devices, and/or piston devices that are of different designs or are different from each other. Furthermore, the specified numerical values are only examples used to illustrate the invention, i.e., a modified piston geometry can result in different pressure ratios, for example.

The method and device according to the invention make it possible to achieve a very high energy-recovery efficiency of at least 90%. The feed pump only has to generate approximately a quarter of the working pressure of approximately 70 bar necessary for reverse osmosis, which entails significant cost-reduction- and service benefits. Consequently, the invention significantly reduces the general manufacturing costs of a device to desalt water and provide drinking water. The specified pressure ratio (17.5 bar: 70 bar) can be fixed at a different ratio. This can be accomplished by modifying the piston geometry. The piston geometry is not limited to a single possible configuration.

Depending on the salt content of the water, the osmotic pressure can and should be adapted. A lower pressure can be selected for brackish water, which has the lowest salt content; in this case the ratio may be changed or adjusted from 1/4:3/4 to 1/3:2/3.

The pressure in the pressure chambers 23, 33, 43 is established during start-up of the device and subsequently is kept constant at that level.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for desalting water, comprising:
    salt water is introduced into a membrane module and is separated into desalted water and concentrated salt water;
    the salt water is conveyed at an increased pressure level from the pressure-compensating device, which comprises several piston devices, to the membrane module;
    the concentrated salt water is discharged from the pressure-compensating device, transferring its pressure energy in the process;
    salt water is introduced into the pressure-compensating device at a pressure level by means of a feed pump;
    in front of the piston, the piston devices contain an intake chamber, which is connected to the feed pump and the membrane module, and in the rear of the piston they contain a discharge chamber, which is connected to the membrane module and a discharge line for concentrated salt water; and
    the pressure chambers of each piston device are fluidly connected by a single pre-charged hydraulic connecting line, the pre-charged hydraulic connecting line in combination with the pressure chambers forms a closed fluid system of preset pressure acting on the pistons, the pressure chambers are located at the piston rear sides of the piston devices, to assist the pressure level, which is exerted on the piston by the concentrated salt water that has been introduced into the discharge chambers.

2. The method according to claim 1, wherein concentrated salt water alternately is introduced into the discharge chamber of one of several piston devices, whereby simultaneously the salt water conveyed from the intake chamber of a first piston device to the membrane module, and in that simultaneously salt water at the same pressure level is introduced into the intake chamber of a second piston device, whereby the concentrated salt water is discharged at a low pressure level from the discharge chamber of the first piston device.

3. The method according to claim 2, wherein the piston devices of the pressure-compensating device are controlled in such a manner that simultaneously salt water is introduced into the intake chamber of at least one of a first piston device, concentrated salt water is discharged from the discharge chamber of the first piston device, concentrated salt water is introduced into the discharge chamber of at least a second piston device, and salt water is conveyed from the intake chamber of the second piston device into the membrane device.

4. The method according to claim 1, characterized in that the piston devices are regulated by controllable intake- and discharge valves.

5. The method according to claim 1, wherein the pressure exerted on a part of the piston is a continuous pressure.

6. A reverse osmosis device for the continuous desalting of water, in particular for the desalting of sea water, comprising:
    a membrane module to separate supplied salt water into desalted water and concentrated salt water;
    a pressure-compensating device, comprising several piston devices, to continuously introduce the salt water at an increased pressure level into the membrane module and to discharge the concentrated salt water, transferring its pressure energy in the process,
    a feed pump to introduce salt water at a pressure level into the pressure-compensating device, whereby
    in front of the piston, the piston devices possess an intake chamber, which is connected to the feed pump and the membrane module, and
    in the rear of the piston, the piston devices possess a discharge chamber, which is connected to the membrane module and to a discharge line for concentrated salt water,
        in the rear of the piston, the piston devices additionally possess a pressure chamber and the pressure chambers of each piston device are fluidly connected by a single pre-charged hydraulic connecting line, the pre-charged hydraulic connecting line in combination with the pressure chambers forms a closed fluid system of preset pressure acting on the pistons.

7. The device according to claim 6, wherein the piston devices are controlled in such a manner that simultaneously salt water is introduced into the intake chamber of at least one piston device, concentrated salt water is discharged from the discharge chamber of the same piston device, concentrated salt water is introduced into the discharge chamber of at least one other piston device, and salt water is conveyed from the intake chamber of the same piston device to the membrane module.

8. The device according to claim 6, wherein the piston devices are regulated by controllable intake- and discharge valves.

9. The device according to claim 7, wherein the connecting lines from the membrane module to the discharge chambers of the piston devices, and the lines to discharge concentrated salt water from the discharge chambers are provided with actively controlled valves.

10. The device according to one of claim 6, wherein the pressure-compensating device contains three identical piston devices.

11. The device according to one of claim 6, wherein the pistons of the piston devices are designed in such a manner that the pressure level prevailing in the pressure chamber can act upon one quarter of the surface area of the piston rear side and the pressure level prevailing in the discharge chamber can act upon three quarters of the surface area of the piston rear side.

12. A system for the continuous desalting of water, comprising:
    a membrane module to separate supplied salt water into desalted water and concentrated salt water;
    a pressure-compensating device comprising a plurality of piston devices, each piston device includes a piston, an intake chamber, a discharge chamber and a pressure chamber, the intake chamber is fluidly connected to a feed pump and the membrane module, the discharge chamber is fluidly connected to the membrane module and to a discharge line for discharging concentrated salt water, the pressure chambers of each piston device are fluidly connected by a single pre-charged hydraulic connecting line, the pre-charged hydraulic connecting line in combination with the pressure chambers forms a closed fluid system of preset pressure acting on the pistons; and a feed pump to introduce salt water at a pressure level into the pressure-compensating device.

13. The device according to claim 12, wherein the piston devices are controlled in such a manner that simultaneously salt water is introduced into the intake chamber of at least one piston device, concentrated salt water is discharged from the discharge chamber of the same piston device, concentrated salt water is introduced into the discharge chamber of at least one other piston device, and salt water is conveyed from the intake chamber of the same piston device to the membrane module.

14. The device according to claim 12, wherein the piston devices are regulated by controllable intake- and discharge valves.

15. The device according to claim 13, wherein connecting lines from the membrane module to the discharge chambers of the piston devices, and lines to discharge concentrated salt water from the discharge chambers are provided with actively controlled valves.

16. The device according to one of claim 12, wherein the pressure-compensating device contains three identical piston devices.

* * * * *